United States Patent
Au

(10) Patent No.: US 11,178,263 B2
(45) Date of Patent: Nov. 16, 2021

(54) SYSTEM AND A METHOD FOR CONTROLLING TIMING OF PROCESSING NETWORK DATA

(71) Applicant: Arista Networks, Inc., Santa Clara, CA (US)

(72) Inventor: Carson Au, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/755,950

(22) PCT Filed: Dec. 13, 2018

(86) PCT No.: PCT/AU2018/000259
§ 371 (c)(1),
(2) Date: Apr. 14, 2020

(87) PCT Pub. No.: WO2019/113628
PCT Pub. Date: Jun. 20, 2019

(65) Prior Publication Data
US 2020/0244783 A1    Jul. 30, 2020

(30) Foreign Application Priority Data
Dec. 13, 2017  (AU) .................................. 2017905001

(51) Int. Cl.
*H04L 29/08* (2006.01)
*G06F 5/08* (2006.01)
(Continued)

(52) U.S. Cl.
CPC .............. *H04L 69/323* (2013.01); *G06F 5/08* (2013.01); *H04L 25/14* (2013.01); *H04L 25/49* (2013.01)

(58) Field of Classification Search
CPC ......... H04B 1/04; H04L 7/033; H04L 43/106; H04L 1/0058; H04L 25/03057; H04L 12/50
See application file for complete search history.

(56) References Cited

U.S. PATENT DOCUMENTS 9,356,721 B2   5/2016  Haulin
9,606,179 B1   3/2017  Cunningham et al.
(Continued)

FOREIGN PATENT DOCUMENTS

KR       10-1396912 B1      5/2014

OTHER PUBLICATIONS

International Search Report issued in corresponding Application No. PCT/AU2018/000259, dated Apr. 1, 2019.
(Continued)

*Primary Examiner* — Iqbal Zaidi
(74) *Attorney, Agent, or Firm* — Chamberlain, Hrdlicka, White, Williams & Aughtry

(57) ABSTRACT

Embodiments of the invention relate to methods and systems for processing a network data block. One or more embodiments of the invention include receiving network data at a receiver/transmitter comprising a serializer/deserializer (SERDES). One or more embodiments of the invention include identifying, by the PHY, a start of a data block within the network data. One or more embodiments of the invention include performing, by the SERDES and after identifying the start of the data block, a SERDES action to obtain a SERDES data block. In one or more embodiments of the invention, the SERDES action is based on an encoding scheme used in transmission of the network data. One or more embodiments of the invention include also includes transmitting the SERDES data block towards a receiver.

22 Claims, 3 Drawing Sheets

(51) Int. Cl.
*H04L 25/14* (2006.01)
*H04L 25/49* (2006.01)

(56) References Cited

U.S. PATENT DOCUMENTS

| | | | |
|---|---|---|---|
| 9,729,259 B2 | 8/2017 | Ekner | |
| 2014/0056370 A1* | 2/2014 | Chang | H04J 3/062 |
| | | | 375/259 |
| 2018/0343183 A1* | 11/2018 | Pope | H04L 69/28 |
| 2020/0244383 A1* | 7/2020 | He | H04J 3/06 |

OTHER PUBLICATIONS

Marc Defossez et al.; "LVDS Source Synchronous DDR Deserialization (up to 1,600 Mb/s)"; Xilinx, XAPP101 (v1.0); pp. 1-11; Jul. 22, 2016 (www.xilinx.com).
Written Opinion issued in corresponding Application No. PCT/AU2018/000259, dated Apr. 1, 2019.

* cited by examiner

SYSTEM AND A METHOD FOR CONTROLLING TIMING OF PROCESSING NETWORK DATA

BACKGROUND

Scenarios exist in which data streams are transmitted between devices. Such data streams are often transmitted as a serial data stream of bits (i.e., 0 or 1) that has been encoding using an encoding scheme (e.g., 64b/66b for 10 GbE) into a block of bits (e.g., a 66 bit block). Such data may initially be sent from a sender as parallel data block that is serialized by a serializer/deserializer (SERDES) component before being transmitted. In such cases, the receiver often also includes a SERDES component to deserialize the serial data stream. However, the SERDES component may not be configured to serialize or deserialize data using quantities of bits that align with the encoding scheme, which may lead to increased latency in the data transmission process.

SUMMARY

In general, embodiments of the invention relate to a method for processing a network data block. In one or more embodiments of the invention, the method includes receiving network data at a receiver/transmitter comprising a serializer/deserializer (SERDES). In one or more embodiments of the invention, the method also includes identifying, by the PHY, a start of a data block within the network data. In one or more embodiments of the invention, the method also includes performing, by the SERDES and after identifying the start of the data block, a SERDES action to obtain a SERDES data block. In one or more embodiments of the invention, the SERDES action is based on an encoding scheme used in transmission of the network data. In one or more embodiments of the invention, the method also includes transmitting the SERDES data block towards a receiver.

In general, in one aspect, embodiments of the invention relate to a system for processing a network data block. In one or more embodiments of the invention, the system includes a receiver/transmitter comprising a serializer/deserializer (SERDES). In one or more embodiments of the invention, the PHY is configured to receive network data and identify a start of a data block within the network data. In one or more embodiments of the invention, the SERDES is configured to perform, after identifying the start of the data block, a SERDES action to obtain a SERDES data block. In one or more embodiments of the invention, the SERDES action is based on an encoding scheme used in transmission of the network data. In one or more embodiments of the invention, the SERDES is also configured to transmit the SERDES data block towards a receiver.

Other aspects of the invention will be apparent from the following description and the appended claims.

DETAILED DESCRIPTION

Figure 1:
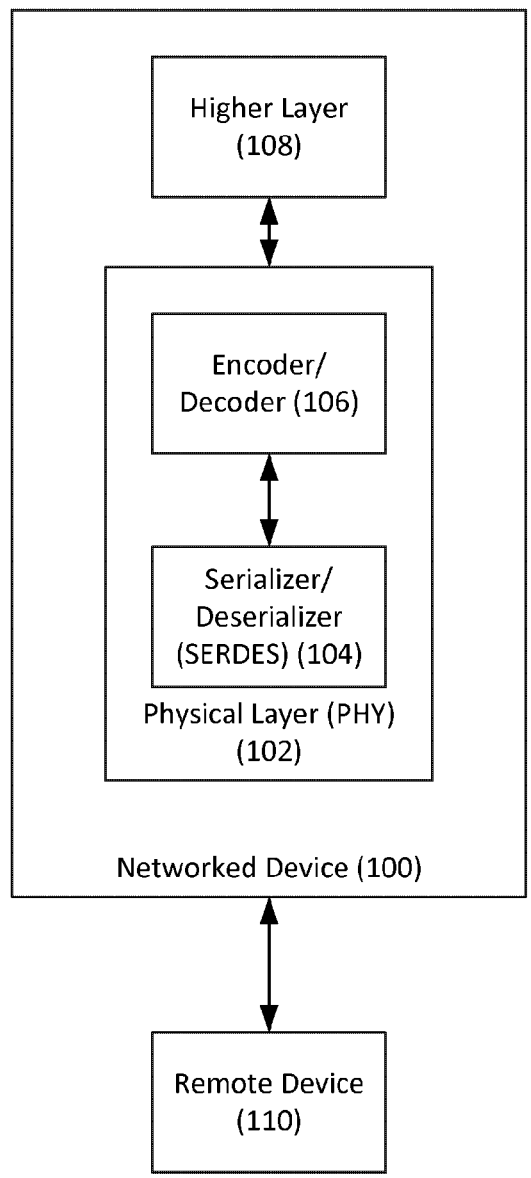
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to systems and methods for serializing and/or deserializing data blocks. Physical transmission of data from one device over a physical medium (e.g., optical fiber, copper wire, etc.) may be performed pursuant to a standard (e.g., 10 Gigabit Ethernet (GbE), Infiniband, Fibre Channel, etc.). Such standards have one or more associated encoding schemes that are employed for the transmission of data over a physical medium. For example, 10 GbE network connections often employ a 64b/66b encoding scheme in which a 64 bit payload is encoded as a 66 bit data block by appending a two bit header of binary digits which is either 10 or 01 to the payload. Such a payload may consist of either all data, to which 01 is appended, or an 8 bit type field and 56 bits of control information and/or data, to which 10 is appended.

In one or more embodiments of the invention, each end of the physical medium over which the data is transmitted is attached to a physical layer (PHY) of a device. In one or more embodiments of the invention, a PHY includes a serializer/deserializer (SERDES) that includes functionality to serialize outgoing data and/or deserialize incoming data. A SERDES may be configured in such a way as to only allow for a limited number of configuration options for the SERDES ratio of the SERDES. In one or more embodiments of the invention, a SERDES ratio is a ratio of one serial input/output to a quantity of parallel inputs/outputs exist (e.g., 1:32).

However, for many encoding schemes, the quantity of parallel inputs/outputs of a SERDES is not equivalent to or a factor of the quantity of bits in a data block that is encoded using the encoding scheme. Accordingly, transmission of the data block between the SERDES and an encoder/decoder within the PHY may require extra clock cycles, which adds latency to the transmission of a data block.

For example, if a SERDES has a 1:32 SERDES ratio, and a 66 bit data block is received in a serial data stream, the transfer of the entire data block to the encoder/decoder of the PHY would take three clock cycles (32 bits, then 32 more bits, then the last two bits). The extra clock cycle is added latency. In one or more embodiments of the invention, such added latency is eliminated by having a SERDES with a SERDES ratio that is a factor of the number of bits in a data block encoded using an encoding scheme. For example, if 64b/66b encoding is being employed, the SERDES may have a SERDES ratio of 1:33, which would require two clock cycles instead of three to transfer a 66 bit data block to or receive from an encoder/decoder, which is a reduction of one clock cycle. Such a reduction in latency may be important, for example, in applications that require very low latency, such as high frequency trading. The configuration of a SERDES ratio that is a factor of the encoding scheme being employed may also reduce the need for additional components and circuitry in the device/component that is attached to the parallel lines of a SERDES. For example, if the SERDES is connected to a physical coding sublayer (PCS), the PCS may not require a gearbox (e.g., a dynamic barrel shifter) for interfacing the SERDES with the encoder/decoder.

FIG. 1 shows a system in accordance with one or more embodiments of the invention. As shown in FIG. 1, the system includes a networked device (100) and a remote device (110). In one or more embodiments of the invention, the networked device (100) includes a PHY (102) and higher layer (108). In one or more embodiments of the invention, the PHY (102) includes a SERDES (104) and an encoder/decoder (106). Each of these components is described below.

In one or more embodiments of the invention, a networked device (100) and a remote device (110) are computing devices. In one or more embodiments of the invention, a computing device is any device or any set of devices capable of electronically processing instructions and that includes, at least, one or more processors, memory, input and output device(s), and a network interface that includes a PHY (102) for transmitting data over a physical medium (e.g., optical fiber, copper, etc.). Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one or more embodiments of the invention, a networked device (100) includes functionality to receive and process data, and to transmit data, over a physical medium pursuant to a protocol. Examples of such protocols include, but are not limited to, 10 GbE, 25 GbE, 40 GbE, 50 GbE, 100 GbE, 200 GbE, 400 GbE, Fibre Channel, Infiniband, Peripheral Component Interconnect (PCIe) 3.0, Common Public Radio Interface (CPRI), Universal Serial Bus (USB) 3.1, Aurora, Thunderbolt, Serial Advanced Technology Attachment (SATA) 3.2, 10 GgE-Ethernet Passive Optical Network (EPON), etc.

Each of the aforementioned protocols employ an encoding scheme when transferring bits via a physical medium. Examples of such encoding schemes include, but are not limited to, are 64b/66b, 128b/130b, 128b/132b, and 256b/257b. In each of the aforementioned encoding schemes, the first number represents the number of bits of the payload of an encoded data block, and the second number represents the number of bits of the entire data block including the payload and header bits. For example, a data block encoded using 64b/66b encoding is a 66 bit data block. Encoding data blocks transmitted over a physical medium may provide state changes, which may be used, for example, in clock data recovery, data stream alignment, and/or may help avoid bit errors in the data stream.

Encoded data blocks may facilitate the transmission of network traffic data units. In one or more embodiments of the invention, a network traffic data unit is any relevant data that is transmitted in a format dictated by any one or more higher layer network protocols or standards. Examples of such protocols or standards include, but are not limited to, Internet Protocol (IP), Media Access Control (MAC), Transmission Control Protocol (TCP), User Datagram Protocol (UDP), Infiniband, Hypertext Transfer Protocol (HTTP), etc. As an example, a MAC frame that includes, but is not limited to, an IP packet may be transmitted over a 10 GbE connection as a series of 66 bit encoded blocks transmitted via optical fiber.

In one or more embodiments of the invention, any number of networked devices may be connected to form a network. In one or more embodiments of the invention, a network may be an entire network or any portion thereof. A network may include a datacenter network, a wide area network, a local area network, or any other suitable network that includes wired connections and that facilitates the exchange of information from one part of the network to another. In one or more embodiments, the network may be coupled with or overlap, at least in part, with the Internet.

In one or more embodiments of the invention, a network (not shown), and any networked devices therein, may be arranged in any network topology. In one or more embodiments of the invention, a network topology is an arrangement of various devices of a network that facilitates the transmission of any number of network traffic data units from one networked device to another networked device.

In one or more embodiments of the invention, a networked device (100) and/or a remote device (110) are a network device, which is a physical device that includes, but is not limited to, all or any subset of the following: persistent storage (not shown), memory (e.g., random access memory (RAM)) (not shown), one or more processor(s) (not shown), one or more network chips (not shown), one or more circuit components (e.g., wire, resistors, capacitors, transistors, inductors, integrated circuitry packages, printed circuit boards, diodes, comparators, etc.) (not shown), one or more field programmable gate arrays (FPGAs) (not shown), one or more application specific integrated circuits (ASICs) (not shown), one or more complex programmable logic devices (CPLDs) (not shown), two or more physical network interfaces (which may also be referred to as ports) that each include a PHY (102). A networked device (100) may be connected to other devices (e.g., remote device (110)) via wired (e.g., using the ports) connections using any type of network cable (e.g., fiber optic cable, twisted pair cable, coaxial cable, etc.).

In one or more embodiments of the invention, a networked device (100) includes functionality to receive network traffic data units at any of the physical network interfaces (i.e., ports) of the network device, and to transmit network traffic data units from any of the physical network interfaces of the networked device (100).

One example of a networked device (100) is a lower layer device. In one or more embodiments of the invention, a lower layer device is a device that includes one or more physical layer switches configured to provide physical connections between ports of the lower layer switch. A physical layer switch may be implemented, at least in part, as a crossbar switch, which has multiple input and output lines arranged in a crossed pattern, with each intersection serving as a switch that may be open to prevent a connection between two ports, or closed to form a connection between two ports of the lower layer device.

Physical layer switches may include functionality to receive network traffic data units from a given port of a lower layer device and, based on the configured connections of the physical layer switch, transmit the received network traffic data unit, or any other network traffic data unit, to one or more other ports to be transmitted toward whatever is connected to the output port.

As used herein, the term lower layer device may refer to devices that also include additional hardware (e.g., FPGA (s)) and/or software to allow for reconfiguration of the connections and other functionality. Such lower layer devices may, for example, function as reconfigurable patch panels. The reconfiguration may occur, for example, via a network administrator using management software to interact, over a network, with any of the hardware and/or software of the lower layer device to reconfigure the connections. Other functionality that may exist in a lower layer device, which may be enabled by additional hardware and/or software, includes, but is not limited to, media conversion, failover, data replication, aggregation, broadcast, monitoring, traffic sampling, multiplexing, filtering, etc.

Other examples of a networked device (100) include a higher level network device. Examples of a higher level network device include, but are not limited to, a layer 2 network switch, a router, a multilayer switch, a fibre channel device, an InfiniBand® device, etc. Higher level devices may include functionality to inspect all or certain portions of a network traffic data unit in order to determine whether to: (i) drop the network traffic data unit; (ii) process the network traffic data unit; and/or (iii) transmit the network traffic data unit, based on the processing, from a physical network interface or port on the higher level network device.

In one or more embodiments of the invention, a networked device (100) includes functionality to store (e.g., in persistent storage, in memory, in a register, etc.), any number of data structures (e.g., filtering information, delay time information, routing information base (RIB), queued and timestamped network traffic data units, etc., forwarding information base (FIB), link state database, counters, etc.) for facilitating operation of at least some aspects of the network device.

Such structures may be stored in a data repository (not shown) included in and/or operatively connected to a network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.

In one or more embodiments of the invention, the networked device (100) includes a PHY (102). In one or more embodiments of the invention, a PHY (102) is anything capable of receiving or transmitting data of any sort, and may be referred to as a receiver/transmitter. In one or more embodiments of the invention, a PHY (102) is the circuitry that implements the physical layer of the Open Systems Interconnection (OSI) Model. In one or more embodiments of the invention; a PHY (102) connects a physical medium to a higher layer (108) of the OSI Model (e.g., a link layer, which is layer 2 of the OSI model). In one or more embodiments of the invention, a PHY (102) is connected to a physical medium (not shown) via a transceiver (not shown). In one or more embodiments of the invention, a PHY (102) is also connected to a higher layer (108) via a wired connection that may include any number of wires. As used herein, wire refers to any type of physical wire, a trace on a printed circuit board, a pin of an integrated circuitry package, a pin of an FPGA, any combination thereof, etc. The term wire is not limited to the aforementioned examples.

In one or more embodiments of the invention, all or a portion of a PHY (102) is a portion of a larger component of a networked device (100). For example, a PHY (102) may be implemented as a portion of an FPGA. As another example, a PHY (102) may be implemented as a portion of a network interface card (NIC). As another example, a PHY (102) may be implemented as a portion of a network chip or line card of a network device.

In one or more embodiments of the invention, the PHY (102) includes a SERDES (104). In one or more embodiments of the invention, a SERDES (104) includes functionality to receive parallel data, and serialize the data into a serial data stream. In one or more embodiments of the invention, a SERDES (104) also includes functionality to receive serial data, and to deserialize the data into a parallel data stream. Such actions may be referred to as SERDES actions.

In one or more embodiments of the invention, a SERDES (104) has one or more SERDES ratios at which the SERDES can operate. In one or more embodiments of the invention, a SERDES ratio is the ratio of the one serial input/output to a quantity of parallel input/outputs. In one or more embodiments of the invention, the one or more SERDES ratios of the SERDES are intentionally based on specific encoding protocols and, as such, have a ratio that is a factor of the number of bits in a data block encoded using the encoding scheme. For example, if 128b/130b encoding is being used, a data block is 130 bits. Therefore, the SERDES may have a 1:65 SERDES ratio (65×2=130), thereby allowing a transfer of the data to/from an encoder/decoder (106) in two clock cycles, with 65 bits being transferred in parallel on each cycle.

In one or more embodiments of the invention, a SERDES (104) may be part of a physical layer attachment (PMA) sublayer (not shown) of a PHY (102). In one or more embodiments of the invention, a PMA includes functionality for performing actions other than SERDES actions. Such additional actions include, but are not limited to, block alignment and clock data recovery (CDR). Block alignment may include the ability to identify the beginning of a data block.

In one or more embodiments of the invention, a SERDES is implemented using one or more shift registers and/or multiplexers. In one or more embodiments of the invention, the SERDES is a set of shift registers and/or multiplexers arranged in a hierarchy. In such embodiments, the aggregate total of the outputs of the shift registers and/or multiplexers in the last layer of the SERDES define the SERDES ratio. For example, if 128b/132b encoding is being used, the SERDES may be a first shift register in first layer of a shift register hierarchy that has a 1:2 ratio, with each output of the first shift register being the input of one of two shift registers in a second layer of a shift register hierarchy, each having a 1:33 shift register ratio. 33×2=66, which is exactly half the number of bits in the encoded data block (i.e., 132) of this example. Such a SERDES would be capable of transmitting or receiving 132 bit data blocks in only two cock cycles of the device/component that is transmitting to the SERDES or receiving the data from the SERDES.

In one or more embodiments of the invention, the PHY (102) also includes an encoder/decoder (106). In one or more embodiments of the invention, the encoder/decoder (106) is connected to the SERDES (104) by a number of parallel connections (e.g., 33) over which the encoder/decoder (106) exchanges parallel data with the SERDES (104). In one or more embodiments of the invention, the encoder/decoder (106) includes functionality to encode outgoing data payloads and decode incoming data blocks pursuant to any one of the aforementioned encoding schemes used to transmit data over a physical medium. For example, the encoder/decoder (106) may receive a 66 bit data block encoded pursuant to the 64b/66b encoding scheme, and decode the data block to obtain the 64 bit payload for transmission to a higher layer (108).

In one or more embodiments of the invention, the encoder/decoder (106) is part of a physical coding sublayer (PCS) (not shown) of a PHY (102). In one or more embodiments of the invention, a PCS includes functionality other than encoding or decoding. Such additional actions include, but are not limited to, block synchronization and line deskew.

Although not shown in FIG. 1, a PHY (102) may include any number of additional components other than a SERDES (104) and an encoder/decoder (106).

In one or more embodiments of the invention, a networked device (100) includes a higher layer (108). In one or more embodiments of the invention, a higher layer (108) is any layer higher than the physical layer (PHY (102)) in a data transmission path, and may be implemented with hardware and/or software. For example, the higher layer (108) may be layer 2 of the OSI model, which may be referred to as the data link layer. A data link layer may have one or more sublayers. For example, the data link layer may include a MAC sublayer that interacts with a PHY (102) to exchange data. In one or more embodiments of the invention, the higher layer is operatively connected to both the PHY (102) and another higher layer (e.g., layer 3 of the OSI model), which may be implemented using hardware and/or software.

While FIG. 1 shows a configuration of components, other configurations may be used without departing from the scope of the invention. For example, a networked device may include any number of PHYs. As another example, a networked device may include any number of layers higher than the higher layer shown in FIG. 1. Accordingly, embodiments disclosed. herein should not be limited to the configuration of components shown in FIG. 1.

Figure 2:
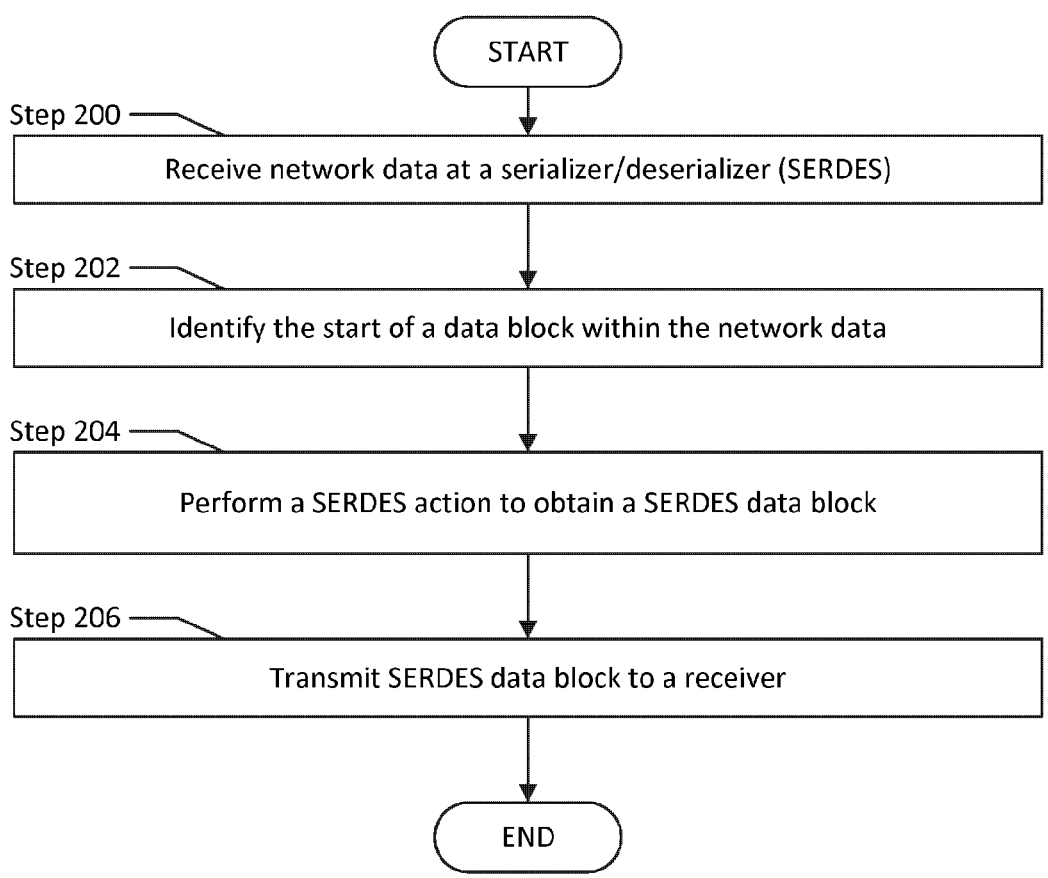
FIG. 2 shows a flowchart in accordance with one or more embodiments of the invention.

FIG. 2 shows a flowchart describing a method for performing serialization and/or deserialization of data blocks in accordance with one or more embodiments of the invention. One or more steps shown in FIG. 2 may be omitted or repeated, and any steps may be performed in any different order among different embodiments of the invention.

In Step 200, network data is received at a SERDES of a PHY. In one or more embodiments of the invention, the data is received at the SERDES as serial data and is received from a physical medium via a transceiver. For example, a computer and a switch may be connected by a 10 GbE connection that starts at a 10 GbE NIC in the computer where a PHY is connected to a transceiver into which is plugged one end of an optical fiber cable. The other end of the optical fiber cable may be plugged into a transceiver of the switch, which is, in turn, connected to a PHY of the switch. In such a scenario, data may be received at the SERDES of the PHY of the switch from the computer, or vice versa.

In one or more embodiments of the invention, the data is received at the SERDES of the PHY as parallel data from another portion of the PHY. For example, the data may be received at the SERDES from PCS that includes an encoder/decoder.

In Sep 202, the beginning of a data block is identified. In one or more embodiments of the invention, a PHY, or portion therein (e.g., a PMA sublayer) includes functionality to identify the beginning of a data block. In one or more embodiments of the invention, the beginning of a data block received serially from a physical medium is identified by first having a training period during which the data stream, including a number of data blocks, is monitored to identify the relevant headers appended to the data blocks pursuant to whatever encoding scheme is being used. For example, 64b/66b encoding encodes data blocks by appending a binary 10 or 01 to the beginning of a 64 bit payload. Therefore, the PHY, or a portion therein, will monitor the stream of data blocks to see a 10 or 01. Once 64 bits after the 10 or 01 pass, if the PHY has achieved block alignment, the next two bits should again be 10 or 01. This may be repeated any number of times to ensure block alignment.

In one or more embodiments of the invention, if the data block is received at the SERDES as parallel data, the SERDES or other components of the PHY that interact with the SERDES may be configured to know that one end of the parallel data is the beginning of the data block. In one or more embodiments of the invention, the SERDES or other components of the PHY that interact with the SERDES that certain parallel connections of the set of parallel connections to the SERDES include the start of a data block. In one or more embodiments of the invention, the SERDES or other components of the PHY that interact with the SERDES may include functionality to examine the parallel data lines during a training period to determine that a portion of the parallel data lines include the header bits of whatever encoding scheme is being employed. For example, if a 64b/66b encoding scheme is being employed, the SERDES or other components of the PHY that interact with the SERDES may examine the parallel data lines to determine which two nearly always include the binary digits 10 or 01 as part of the same 66 bit data block.

In Step 204, a SERDES action is performed on the data block to obtain a SERDES data block. In one or more embodiments of the invention, a SERDES action is either serialization or deserialization of a data block. In one or more embodiments of the invention, a SERDES data block is a data block that has either been serialized or deserialized by the SERDES of the PHY. In one or more embodiments of the invention, as discussed above in the description of FIG. 1, the SERDES is configured to have a SERDES ratio that is a factor of the number of bits of a data block encoded using a given encoding scheme. Therefore, the portions of the data block being sent out or received as parallel data may be sent using only as many clock cycles as necessary to send the entire data block, with no cycles wasted sending a portion of a data block that is less than the number of parallel input/outputs.

As an example, for a SERDES receiving and transmitting data bocks encoded using a 128b/132b encoding scheme, where the SERDES has a 1:33 SERDES ratio, there are 33 parallel input/output lines of the SERDES. If the SERDES is transmitting data to a PCS of a PHY, the PCS will take the first 33 bits of the data block from the outputs of the SERDES on a first clock cycle, a second 33 bits on a second clock cycle, a third 33 bits on a third clock cycle, and a fourth 33 bits on a fourth clock cycle. Therefore, the entire encoded data block is transmitted to the PCS in four clock cycles, with no extra clock cycles to transmit data on output lines that is not part of the previously sent data block portion. Contrast this with a SERDES that is configured with a 1:32 SERDES ratio without regard for the 128b/132b encoding scheme being used. Such a SERDES would transmit 32 bits to the PCS on a first clock cycle, 32 two more bits on a second clock cycle, 32 more bits on a third clock cycle, 32 more bits on a fourth clock cycle, and then have to use a fourth clock cycle to transmit the remaining 4 bits of the data block. Therefore, having a SERDES with a 1:32 SERDES ratio when using a 128b/132b encoding scheme leads to an entire extra clock cycle of latency that is eliminated when using the 1:33 SERDES ratio that is based on the encoding scheme and includes a number of parallel lines that is a factor of the size of the encoded 132 bit data block.

In Step 206, the SERDES data block is transmitted to a receiver. In one or more embodiments of the invention, as discussed above, if the data block was received as a serial stream of bits at a serial input of the SERDES, the SERDES deserializes the data block into a number of parallel outputs that is a factor of the number of bits of the data block. The parallel data is then transmitted to a component (i.e., the receiver) that includes functionality to decode an encoded data block. In one or more embodiments of the invention, if the data block is received as parallel data on the parallel inputs of the SERDES, then the SERDES serializes the data and transmits the data to a physical medium via a transceiver, and from there to a receiver (e.g., a remote device).

Figure 3:
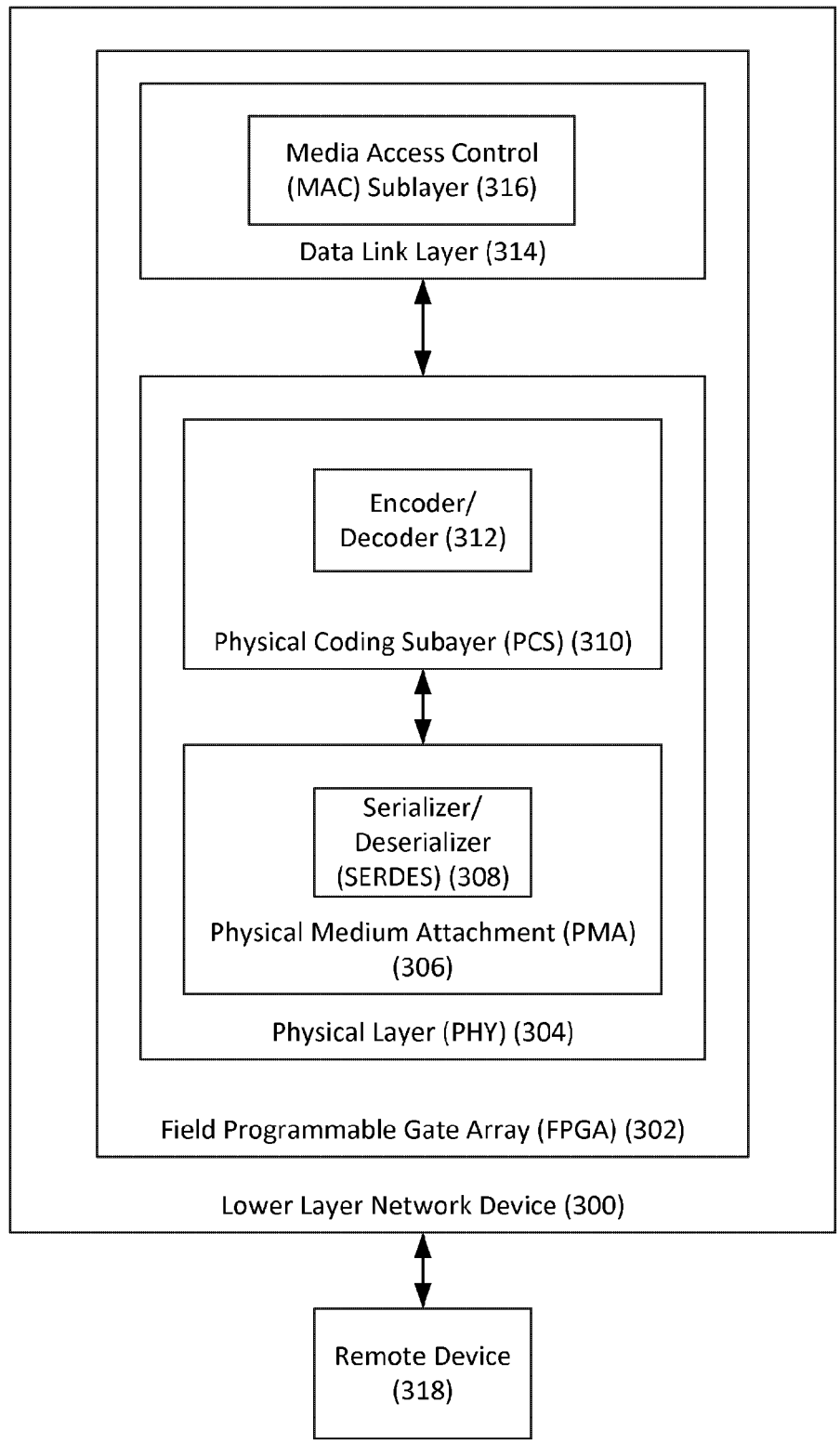
FIG. 3 shows an example in accordance with one or more embodiments of the invention.

FIG. 3 shows an example in accordance with one or more embodiments of the invention. The following example is for explanatory purposes only and not intended to limit the scope of the invention.

Referring to FIG. 3, consider a scenario in which a lower layer network device (300) is connected to a remote device (318) via a 10 GbE connection using optical fiber cable. The lower layer network device includes an FPGA (302). The FPGA (302) includes a data link layer (314) and a PHY (304). The data link layer (314) includes a MAC sublayer (316). The PHY (304) includes a PMA (306) and a PCS (310). The PMA (306) includes a SERDES (308). The PCS (310) includes an encoder/decoder (312).

In such a scenario, the PMA (306) also includes a clock data recovery (CDR) component (not shown). The 10 GbE connection is using a 64b/66b encoding scheme. Accordingly, the SERDES (308) has a SERDES ratio that is a factor of 66. Specifically, the SERDES ratio of the SERDES (308) in this example is 1:33. The SERDES (308) is implemented using a 1:3 first shift register that has a serial input line for receiving serial data from and transmitting serial data to the CDR component, which is connected to a transceiver, which is connected to the optical fiber through which the data blocks are transmitted. The three outputs of the first shift register are each connected to the serial input of one of three 1:11 shift registers. The three 1:11 shift registers provide the overall 1:33 SERDES ratio of the SERDES (308).

The shift registers are implemented using two sets of flip flops. The first set receives data and shifts the received bit to a next flip flop on an edge of a clock cycle of the data stream. The second set has inputs connected to the outputs of the first set. The second set outputs data at a clock cycle that is configured to be the clock cycle of the data divided by the number of parallel outputs of the shift register. Thus, in this scenario, the 1:3 shift register shifts 3 bits out every three clock cycles of the data stream, and the set of three 1:11 shift registers shift 11 bits of data out every 11 clock cycles of the clock of the receiving flip flops of the 1:11 shift registers.

When data is received from at the from the optical fiber, the data stream is monitored during a training period to identify a pattern of binary 10 or 01 that consistently occurs 64 bits apart, thereby allowing for identification of the start of a 66 bit data block.

Once the start of a block has been reliably identified, the SERDES (308) receives the first bit of the 66 bit data block at an input of a first flip flop of the 1:3 shift register. At the next rising edge of a recovered data stream clock cycle, the first bit is sent to the output of the first shift register, which is connected to the input of a second shift register and the input of the first shift register becomes the second bit of the 66 bit data block. At the next rising edge of the recovered clock, the first bit is sent to the output of the second flip flop and thereby to the input of a third flip flop, the second bit is sent to the output of the first flip flop and thereby the input of the second flip flop, and the input of the first flip flop becomes the third bit of the 66 bit data block. At the next rising edge of the recovered clock, the first bit is sent to the output of the third flip flop, the second bit is sent to the output of the second flip flop, and the third bit is sent to the output of the first flip flop.

Each input of a second set of three flip flops is has each flip flop's input connected to the outputs of the first set of flip flops, which now have the first three bits of the 66 bit data block. Next, the divided-by-three clock of the second set of flip flops has a rising edge, and each of the three bits are transferred to the outputs of the second set of flip flops, which are connected to the serial inputs of the 1:11 shift registers. Then, the 1:3 shift register is reset, and the process continues for another three bits, and so on.

As the 1:3 shift register outputs three bits, the 1:11 shift registers receive the bits, with one of the three bits going to a different one of the three 1:11 shift registers. The 1:11 shift registers perform a process similar to that described above, receiving a bit, and then shifting the bit on a rising edge of a clock through a set of 11 flip flops. Another set of 11 flip flops has a clock that is the clock of the receiving set of 11 flip flops divided by 11. On the rising edge of that clock, 11 bits are transferred to the outputs of each of the 1:11 shift registers. Thus, 33 bits are available for receipt by the PCS, which accepts them on the rising edge of its local clock cycle.

The above-described process is repeated for the next 33 bits of the 66 bit data block, thereby transferring the entire 66 bit data block to the PCS in two local clock cycles of the PCS.

Now consider a scenario in which the SERDES (308) is implemented with a 1:66 SERDES ratio. In this scenario, the SERDES (308) is implemented using a 1:3 first shift register that has a serial input line for receiving serial data from and transmitting serial data to the CDR component, which is connected to a transceiver, which is connected to the optical fiber through which the data blocks are transmitted. The three outputs of the first shift register are each connected to the serial input of one of three 1:22 shift registers. The three 1:22 shift registers provide the overall 1:66 SERDES ratio of the SERDES (308).

The shift registers in this scenario are again implemented using two sets of flip flops. The first set receives data and shifts the received bit to a next flip flop on an edge of a clock cycle of the data stream. The second set has inputs connected to the outputs of the first set. The second set outputs data at a clock cycle that is configured to be the clock cycle of the data divided by the number of parallel outputs of the shift register. Thus, in this scenario, the 1:3 shift register shifts 3 bits out every three clock cycles of the data stream, and the set of three 1:22 shift registers shift 22 bits of data out every 22 clock cycles of the clock of the receiving flip flops of the 1:22 shift registers.

When data is received from at the from the optical fiber, the data stream is monitored during a training period to identify a pattern of binary 10 or 01 that consistently occurs 64 bits apart, thereby allowing for identification of the start of a 66 bit data block.

Once the start of a block has been reliably identified, the SERDES (308) receives the first bit of the 66 bit data block at an input of a first flip flop of the 1:3 shift register. At the next rising edge of a recovered data stream clock cycle, the first bit is sent to the output of the first shift register, which is connected to the input of a second shift register and the input of the first shift register becomes the second bit of the 66 bit data block. At the next rising edge of the recovered clock, the first bit is sent to the output of the second flip flop and thereby to the input of a third flip flop, the second bit is sent to the output of the first flip flop and thereby the input of the second flip flop, and the input of the first flip flop becomes the third bit of the 66 bit data block. At the next rising edge of the recovered clock, the first bit is sent to the output of the third flip flop, the second bit is sent to the output of the second flip flop, and the third bit is sent to the output of the first flip flop.

Each input of a second set of three flip flops is has each flip flop's input connected to the outputs of the first set of flip flops, which now have the first three bits of the 66 bit data block. Next, the divided-by-three clock of the second set of flip flops has a rising edge, and each of the three bits are transferred to the outputs of the second set of flip flops, which are connected to the serial inputs of the 1:22 shift registers. Then, the 1:3 shift register is reset, and the process continues for another three bits, and so on.

As the 1:3 shift register outputs three bits, the 1:22 shift registers receive the bits, with one of the three bits going to a different one of the three 1:22 shift registers. The 1:22 shift registers perform a process similar to that described above, receiving a bit, and then shifting the bit on a rising edge of a clock through a set of 22 flip flops. Another set of 22 flip flops has a clock that is the clock of the receiving set of 22 flip flops divided by 22. On the rising edge of that clock, 22 bits are transferred to the outputs of each of the 1:22 shift registers. Thus, 66 bits are available for receipt by the PCS, which accepts them on the rising edge of its local clock cycle.

The above-described process thereby transfers the entire 66 bit data block to the PCS in one local clock cycle of the PCS.

Embodiments of the invention described herein reduce the latency of data transmission by having a SERDES that has a SERDES ratio that is a factor of the number of bits of a data block that is encoded using an encoding scheme. This may reduce the number of clock cycles of a component connected to the parallel line of the SERDES, as well as the need for additional hardware in such a component.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a network data block, the method comprising:
   receiving network data at a receiver/transmitter comprising a serializer/deserializer (SERDES) comprising a plurality of shift registers arranged in a hierarchy of at least two layers;
   identifying a start of a data block within the network data;
   performing, by the SERDES and after identifying the start of the data block, a SERDES action to obtain a SERDES data block, wherein the SERDES action is based on an encoding scheme used in transmission of the network data; and
   transmitting the SERDES data block towards a receiver.

2. The method of claim 1, wherein the SERDES action is a deserialization of serial data received from a physical medium and transmitted as a parallel data block to an encoder/decoder.

3. The method of claim 1, wherein the SERDES action is a serialization of parallel data received from an encoder/decoder and transmitted to a remote device via a physical medium.

4. The method of claim 1, wherein the data block includes a first number of bits, and the SERDES data block includes a second number of bits that is a factor of the first number of bits.

5. The method of claim 1, wherein the SERDES is implemented using a plurality of shift registers.

6. The method of claim 1, wherein the plurality of shift registers comprises a first set of shift registers and a second set of shift registers arranged in the hierarchy.

7. The method of claim 1, wherein the SERDES has a one to thirty-three (1:33) SERDES ratio.

8. The method of claim 1, wherein the SERDES has a one to twenty-two (1:22) SERDES ratio.

9. The method of claim 1, wherein identifying the start of the data block within the network data comprises monitoring a plurality of data blocks in a data stream during a training period.

10. The method of claim 1, wherein the receiver/transmitter is a physical layer (PHY) and the PHY comprises a physical medium attachment sublayer that comprises the SERDES.

11. The method of claim 10, wherein the PHY further comprises a physical coding sublayer that comprises an encoder/decoder.

12. A system for processing a network data block, the system comprising:
   a receiver/transmitter comprising a serializer/deserializer (SERDES) and configured to:
      receive network data; and
      identify a start of a data block within the network data; and
   the SERDES configured to:
      perform, after identifying the start of the data block, a SERDES action to obtain a SERDES data block, wherein the SERDES action comprises serializing or deserializing the data block using a SERDES ratio that is based on an encoding scheme used in transmission of the network data; and transmit the SERDES data block towards a receiver.

13. The system of claim 12, wherein the system further comprises an encoder/decoder, and wherein the SERDES action is a deserialization of serial data received from physical medium and transmitted as a parallel data block to the encoder/decoder.

14. The system of claim 12, wherein the SERDES action is a serialization of parallel data received from an encoder/decoder and transmitted to a remote device via a physical medium.

15. The system of claim 12, wherein the data block includes a first number of bits, and the SERDES data block includes a second number of bits that is a factor of the first number of bits.

16. The system of claim 12, wherein the SERDES is implemented using a plurality of shift registers.

17. The system of claim 16, wherein the plurality of shift registers comprises a first set of shift registers and a second set of shift registers arranged in a hierarchy.

18. The system of claim 12, wherein the encoding scheme is 64/66b and the SERDES has a one to thirty-three (1:33) SERDES ratio.

19. The system of claim 12, wherein the encoding scheme is 64/66b and the SERDES has a one to twenty-two (1:22) SERDES ratio.

20. The system of claim 12, wherein the receiver/transmitter is configured to identify the start of the data block by monitoring a plurality of data blocks in a data stream during a training period.

21. The system of claim 12, wherein the receiver/transmitter is a physical layer (PHY) and the PHY comprises a physical medium attachment sublayer that comprises the SERDES.

22. The system of claim 21, wherein the PHY further comprises a physical coding sublayer that comprises an encoder/decoder.

\* \* \* \* \*